United States Patent
Kumar

(10) Patent No.: US 10,958,967 B2
(45) Date of Patent: *Mar. 23, 2021

(54) UNIVERSAL MIRRORING RECEIVER

(71) Applicant: App Dynamic ehf, Kopavogur (IS)

(72) Inventor: Pratik Kumar, Kopavogur (IS)

(73) Assignee: App Dynamic ehf, Kopavogur (IS)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,048

(22) Filed: Feb. 27, 2020

(65) Prior Publication Data

US 2020/0221164 A1 Jul. 9, 2020

Related U.S. Application Data

(63) Continuation of application No. 15/520,835, filed as application No. PCT/IB2015/002155 on Oct. 22, 2015, now Pat. No. 10,587,909.

(60) Provisional application No. 62/067,845, filed on Oct. 23, 2014.

(51) Int. Cl.
| | |
|---|---|
| H04N 21/43 | (2011.01) |
| H04N 21/436 | (2011.01) |
| H04N 21/2365 | (2011.01) |
| H04N 21/41 | (2011.01) |
| H04N 21/431 | (2011.01) |
| H04N 21/47 | (2011.01) |
| H04L 29/06 | (2006.01) |
| H04N 21/434 | (2011.01) |

(52) U.S. Cl.
CPC ..... *H04N 21/4307* (2013.01); *H04L 65/4076* (2013.01); *H04N 21/2365* (2013.01); *H04N 21/4122* (2013.01); *H04N 21/4126* (2013.01); *H04N 21/4312* (2013.01); *H04N 21/4316* (2013.01); *H04N 21/4341* (2013.01); *H04N 21/4344* (2013.01); *H04N 21/4347* (2013.01); *H04N 21/43615* (2013.01); *H04N 21/47* (2013.01)

(58) Field of Classification Search
CPC .......... H04N 21/4307; H04N 21/43615; H04L 65/4076
See application file for complete search history.

(56) References Cited

U.S. PATENT DOCUMENTS

| | | | |
|---|---|---|---|
| 8,599,311 | B2 | 12/2013 | Nissan-Cohen |
| 2013/0094423 | A1 | 4/2013 | Wengrovitz |

(Continued)

FOREIGN PATENT DOCUMENTS

| | | | | |
|---|---|---|---|---|
| CN | 103530032 A | | 1/2014 | |
| WO | WO-2016169106 A1 | * | 10/2016 | ............ H04W 72/04 |

OTHER PUBLICATIONS

Chinese Office Action (with partial English language translation) for App No. CN201580057840.4, dated Jun. 3, 2019, 9 pages.

(Continued)

*Primary Examiner* — Robert J Hance
(74) *Attorney, Agent, or Firm* — Koffsky Schwalb LLC

(57) ABSTRACT

A screen mirroring receiving device capable of receiving mirroring streams comprising audio-visual data, the mirroring streams conforming to different vendor-provided screen-mirroring protocols, and capable of processing the mirroring streams for audio-visual rendering.

20 Claims, 3 Drawing Sheets

(56) References Cited

U.S. PATENT DOCUMENTS

| | | | |
|---|---|---|---|
| 2013/0346564 A1* | 12/2013 | Warrick | H04L 41/0893 |
| | | | 709/219 |
| 2014/0002389 A1* | 1/2014 | Kim | H04N 5/4403 |
| | | | 345/173 |
| 2014/0009394 A1* | 1/2014 | Lee | H04N 21/42222 |
| | | | 345/157 |
| 2014/0267908 A1* | 9/2014 | Hagenbuch | H04N 21/4314 |
| | | | 348/552 |
| 2014/0297328 A1 | 10/2014 | Rock | |
| 2014/0297815 A1 | 10/2014 | Rajapakse | |
| 2015/0281769 A1* | 10/2015 | Chiu | H04N 5/4403 |
| | | | 348/564 |
| 2018/0205986 A1* | 7/2018 | Cao | H04N 21/4122 |

OTHER PUBLICATIONS

European Extended Search Report issued in EP App. No. 15856358. 5, dated Jul. 25, 2018, 10 pages.

\* cited by examiner

UNIVERSAL MIRRORING RECEIVER

CROSS-REFERENCE TO RELATED APPLICATIONS

This application is a continuation of U.S. patent application Ser. No. 15/520,835, filed on Apr. 20, 2017, which is a national stage application under 35 U.S.C. 371 of International Application No. PCT/IB2015/002155, filed Oct. 22, 2015, which claims priority under 35 U.S.C. 119(e) to U.S. Provisional Application No. 62/067,845, filed Oct. 23, 2014, incorporated herein in its entirety.

FIELD OF THE INVENTION

The invention is directed to wireless mirroring from multiple types of device platforms (operating systems) via multiple types of mirroring protocols to a single receiver capable of receiving mirroring streams from devices.

BACKGROUND OF THE INVENTION

The limitation with current mirroring technologies is that heterogeneous operating system platforms (e.g., Apple®, Google® Android™, Microsoft® Windows®) are unable to mirror content to a single content receiver. Apple® iOS® mobile computing devices can use the AirPlay® protocol to mirror content to devices such as the Apple TV, which can be connected to a screen such as a TV. Similarly, other device platforms (e.g. Android, Windows) can currently make use of technologies such as Chromecast, Google Cast™, Miracast®, DNLA, Mirrorop and Airtame to achieve mirroring for their relevant platforms.

It is commonly known that people often need to present content from their computing devices. A typical example of content presentation is a user with his or her computer/laptop connected to a projector in a meeting room, classroom or any type of venue that has an external display. The user has the need to show others, or generally visualize, the screen contents of their device on an external display. An external display can be a projector or a TV or any device connectable to a laptop/computer. This situation requires the laptop/computer to be physically connected with a cable. In other cases the receiver or "receiving device" may be built in/embedded in a TV or projector, or in a dongle running receiver software. When many people are presenting, switching from one user to another requires the cable to be disconnected from one laptop/computer and connected to the laptop/computer of the person who needs to present content. This method of presenting is considered suboptimal for the following reasons: disconnecting and connecting are physical operations, and the sound from the device is not projectable to the external display. In general, these problems are solved with a technology called screen mirroring.

Mirroring is an umbrella term for a group of wireless technologies that facilitate the projection of what you see and hear on a sending device or computer to a receiving device's display and speakers.

Apple has implemented a mirroring solution through its AirPlay® protocol (http://en.wikipedia.org/wiki/AirPlay#AirPlay_Mirroring). Apple's iPhone® (as of version 4S) and iPad® mobile devices (both of which run the iOS operating system) are capable AirPlay sending devices and Apple's Apple TV® digital media extender is a capable receiver. Apple TV is a hardware solution while other receivers, such as AirServer, can do the same as a software solution, AirPlay requires the sending and receiving devices to be connected to the same wireless network in order to work.

Other vendors that utilize Microsoft Windows or Google Android operating systems are making use of different solutions such as Miracast (http://en.wikipedia.org/wiki/Miracast) or Chromecast (https://en.wikipedia.org/wiki/Chromecast). To mirror devices from these vendors, one needs a Miracast or Chromecast capable sending device such as an Android mobile computing device (e.g. a mobile phone or tablet), or a Windows device, such as a mobile phone, tablet, laptop or desktop computer, and a Miracast/Chromecast capable receiver. Such receivers can be a Miracast/Chromecast dongle (a small device plugged into the HDMI port of a TV set) or a TV set with a built-in Miracast receiver. Miracast does not require the sending device and the receiver to be connected to the same wireless network in order to work. Using Miracast, one can simply mirror from the sending device to the receiving device directly.

Both Apple TV and typical Miracast receiving devices only allow for one device to send to the receiver at each time. There exists no solution that allows an AirPlay sending device and a Miracast sending device to be connected to the same receiver at the same time. This is because there exists no receiver capable of receiving mirroring from multiple heterogeneous platforms simultaneously. This requires a user to decide whether to mirror only Apple iOS devices using an AirPlay receiver or only Miracast capable sending devices using a Miracast receiver. The downside of this is that users with Miracast capable sending devices are excluded from mirroring if one has chosen to use an AirPlay based receiver, and vice versa.

There is a need for a device which allows a single content receiver to receive mirroring streams from multiple heterogeneous platforms. While many industries permit their people to "Bring Your Own Device" (BYOD) to work, the lack of a receiver capable of handling heterogeneous mirroring streams means that not all devices can be used equally and effectively.

BRIEF SUMMARY OF THE INVENTION

The present invention is a software-based solution which receives multiple simultaneous device connections with the ability to mirror the streams to an external display. The present invention provides the ability to mirror multiple heterogeneous platform technologies, thus enabling reception of mirrored content from those platforms simultaneously, including the ability for many devices to be connected at the same time. Users/owners of heterogeneous computing devices will be able to mirror content (participate) simultaneously (collaborate and compare), thereby eliminating the limitation currently present to users of heterogeneous computing devices. As an example, in a classroom situation, all users are able to mirror content to a projector regardless of their choice of computing device and operating system. The present invention enables users to truly bring their own device, or device of choice, to a sharing session, and lifts the limitation of requiring a specific device platform to participate. As manufacturers of device platforms all aim at making their platforms in such a way that competitors in that area are excluded, the present invention eliminates those restrictions by providing the ability to simultaneously mirror content from various technologies provided by platform manufacturers in a single receiver accepting heterogeneous platforms.

In a first embodiment, the invention is directed to a receiver for heterogeneous platforms including a first protocol handler, and second protocol handler, first protocol handler video decoder, second protocol handler video decoder, demultiplexer, audio renderer, video renderer and a video layout manager. The video layout manager consists of an image positioning module; a sealing module and an image enhancement module. The present embodiment includes a connecting means to connect each of the components.

In another embodiment, the invention is directed to a method for combining "transmitted data"/"network packets" provided by platform manufacturers into a single receiver accepting mirroring data from heterogeneous platforms and protocols. The method includes the sequential steps of preparing the receiver of the present invention as provided in the previous embodiment. After preparation of the receiver, the method continues with the receiving of at least two video signals and at least two audio signals from the heterogeneous platforms by the receiver. The video signals that are received from at least two heterogeneous platforms are synchronized with their associated audio signals. The method concludes by simultaneously sending the synchronized video signals and audio signals to available output devices (i.e. video renderer and audio renderer).

In yet another embodiment, the invention is directed to computer-readable medium storing software that combines "transmitted data"/"network packets" provided by platform manufacturers into a single receiver accepting from heterogeneous platforms. The software includes executable code that receives at least two video signals from the heterogeneous platforms and receives at least two audio signals from the heterogeneous platforms, and executable code that synchronizes at least two video signals and audio signals from heterogeneous platforms in the receiver. Executable code directs a synchronized signal from at least two video signals from heterogeneous platforms in the receiver to a video renderer (such as a video card). Thereafter, executable code simultaneously distributes the synchronized signal from at least two audio signals to a sound renderer (such as a sound card).

DETAILED DESCRIPTION OF THE INVENTION

Certain terminology is used herein for convenience only and is not to be taken as a limitation on the present invention. The terminology includes the words specifically mentioned, derivatives thereof and words of similar import. The embodiments discussed herein are not intended to be exhaustive or to limit the invention to the precise form disclosed. These embodiments are chosen and described to best explain the principle of the invention and its application and practical use, and to enable others skilled in the art to best utilize the invention.

Figure 1:
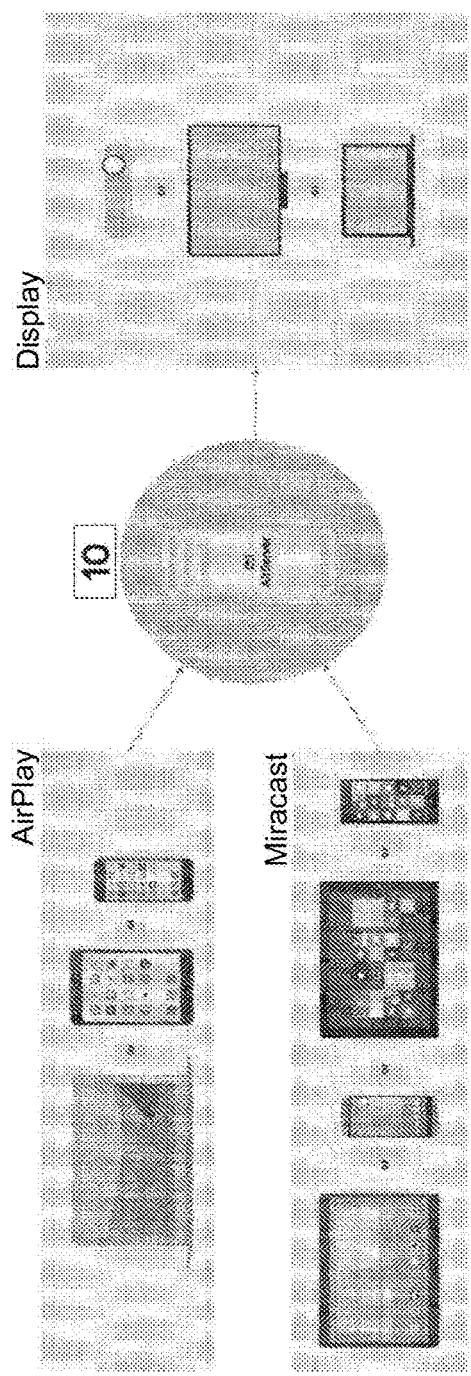
FIG. 1 is an illustration of the present invention, which receives input from a first and second protocol signal.

Referring to FIG. 1, in a first embodiment the invention is directed to a device of the present invention illustrated in relation to the incoming signals and displays. As illustrated, the receiver 10 provides the transformation of the two signals, as illustrated for example purposes, one from an AirPlay capable device and one from a Miracast capable device, for presentation on any output device receiving the "mirrored platforms". However, one skilled in the art would appreciate that the receiver 10 could handle multiple signals in an amount greater than two.

Figure 2:
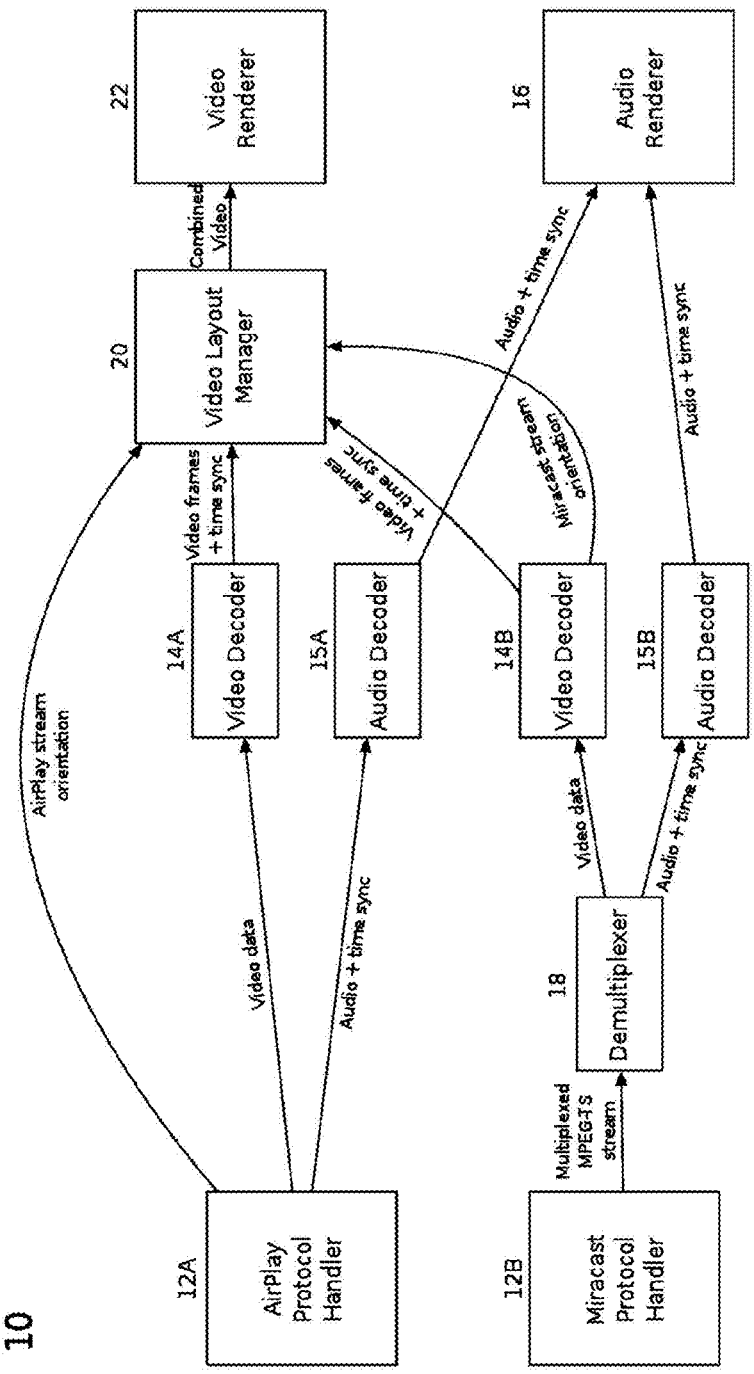
FIG. 2 illustrates the receiver receiving signals via multiple protocols and combining them into a single video and audio stream to be rendered by a receiver's audio and video renderers.
Figure 3:
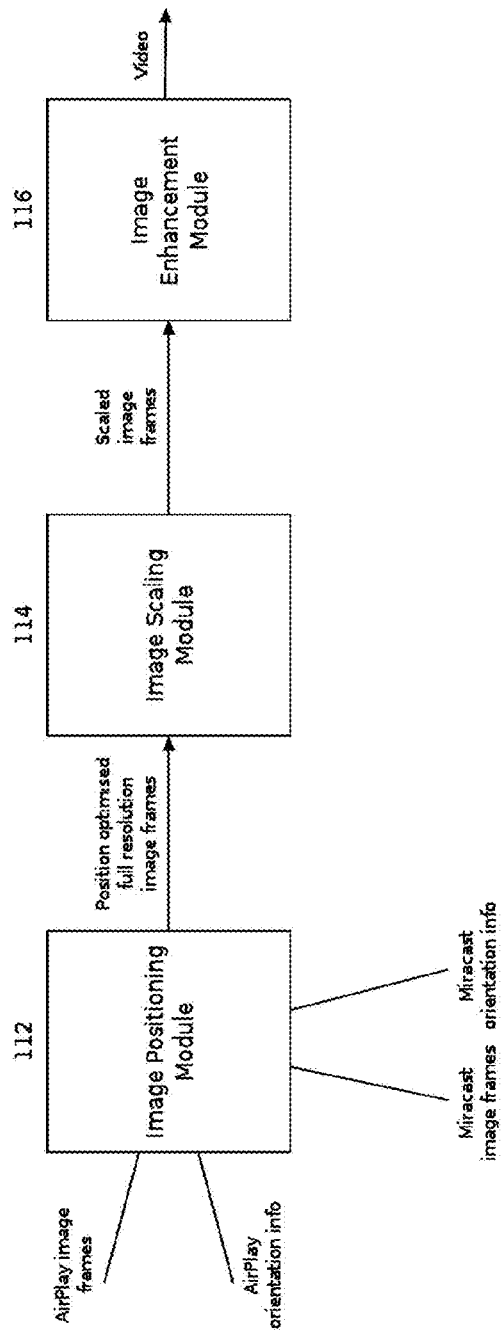
FIG. 3 illustrates the simultaneous multiple video handling of the receiver.

Referring to FIGS. 2 and 3, in a first embodiment, the invention is directed to a receiver 10 for heterogeneous platforms including a first protocol handler 12A and a second protocol handler 12B; as illustrated in the present embodiment "AirPlay Protocol Handler" and "Miracast Protocol Handler" respectively. The inclusion of additional heterogeneous platforms would require additional protocol handlers. A separate protocol handler for each new protocol is required as each protocol can differ significantly, for example in how it transports audio and video. Some protocols transport it "joined" or "multiplexed" using the same transport mechanism (as in the case of Miracast) while others (such as AirPlay) use separate transport mechanisms for audio and video. The protocol handlers 12A and 12B include unique software code that identifies what protocol is being transmitted and selects the appropriate conversation mode, similar to a person hearing a language and switching to that language in order to converse. The code supports "conversation" with the remote device via the protocol. One skilled in the art will appreciate that the protocols (AirPlay and Miracast) are "spoken languages"; each protocol is a type of a "spoken language". Much like a language is native to a person "spoken language"; a person can learn other languages (non-native) and can therefore speak more than one language. A "spoken language" is a protocol, both native and non-native"; for illustration AirPlay is from Apple™ and Miracast is from Wi-Fi Alliance™.

In the present invention, the software has the ability to 1) recognize the language (protocol) of each incoming signal, and 2) adjust (based on the protocol) to provide the necessary sequential steps to support the resultant "mirroring" from multiple sending protocols. The core of this invention is to mirror signal from multiple senders. However, one skilled in the art would recognize there is nothing that would prevent the device from directing its output to multiple recipients. The concept of the present invention includes mirroring to multiple recipients as appreciated by the scope of the information in this document.

The first protocol handler 12A emits a video stream to a first protocol handler video decoder 14A, and an audio stream to an audio decoder 15A connected to the first protocol handler 12A's output, "Audio+time sync". Therefore, the audio and video have been separated and have associated time synchronization information. The time synchronization is then used by an internal clock of the computing device running the present invention, which ensures that the video and audio is correctly synchronized when it is processed by the video and audio renderers (e.g. displayed on a screen or played in speakers). As illustrated, both audio streams go through the audio renderer; as would all other audio from additional protocols if included.

The second protocol handler 12B emits a multiplexed signal to a demultiplexer 18. The multiplexed signal contains potentially multiple streams, normally an audio stream and a video stream. A "demultiplexer" is a module that separates an input signal into separate data streams. A demultiplexer selects one of several analog or digital input signals and forwards the selected input signal into a single line. Each "parcel" of data, being either a multiplexed audio or video frame within the multiplexed signal, will have an identifier specifying which of these streams it belongs to. An "Audio decoder" module 15B connected to the demultiplexer 18 "output" labeled "Audio+time sync" is illustrated. As illustrated, the paths of the signal for AirPlay and Miracast are different because each protocol can transport audio and video either through a single transport mechanism (e.g. Miracast) or use separate transport mechanism for audio and video (e.g. Airplay). In the case of a single transport mechanism, a multiplexer is needed to separate the audio and the video into two streams.

The demultiplexer 18 emits a video stream to a second protocol handler video decoder 14B and an audio stream to the audio decoder 15B which is then sent to the audio renderer 16. The first protocol handler video decoder 14A and second protocol handler video decoder 14B each submit a stream to a video layout manager 20.

Referring to FIG. 3, the video layout manager 20 receives two signals (each signal containing video frames) but emits only one. As a unit, the video layout manager 20 integrates multiple components including an image positioning module 112 which receives a video stream from the first protocol handler video decoder 14A, and a video stream from the second protocol handler video decoder 14B. A scaling module 114 and an image enhancement module 116 receive the single emitted stream from the image positioning module 112.

The receiver of the present invention recognizes the display area of a "viewing device", e.g. TV or monitor, etc., that is available to display the combined (single stream) final image. The image positioning module 112 arranges the layout of the input video signals so that they use the available space (the horizontal and vertical resolution of the output video signal) efficiently. In the case of two devices, on a normal monitor with a 16:9 aspect ratio, one video signal will be rendered on the left and the other on the right. If a third device joins, either each device will be displayed on the same row or a new row might be added with two signals being displayed in the first row (one to the left, the other to the right) and the third signal displayed in the second row. The algorithm of the software regards the input signal as having a square resolution (using the greater of width or height) so as to allow the device to rotate on screen freely, without causing other device display areas to move in the final output.

As best illustrated in FIG. 3, the single emitted stream from the image positioning module 112 to the scaling module 114 has "position optimized full resolution image frames" and is emitted thereafter to the image enhancement module 116. Collectively, the image positioning module 112, scaling module 114 and image enhancement module 116 are referred to as the "video layout manager", best illustrated in FIG. 3. The protocol handlers 12A, 12B inform the image positioning module 112 when a new connection has been made by signaling it and passing it the resolution of the new video stream. The protocol handlers 12A, 12B also inform the image positioning module 112 when a device is disconnected. These connect and disconnect events cause a new layout to be made for positioning the incoming video streams in the final display.

Referring again to FIG. 2, the single emitted stream from the video display manager 20 is directed to the video renderer 22.

As discussed, one skilled in the art would recognize the present embodiment illustrates two incoming connections, but could include multiple incoming connections, allowing the receiver to act as a conduit for the streams of an unlimited number of devices.

The invention will now be described in additional embodiments wherein like reference numbers are meant to illustrate like features.

As best illustrated in FIG. 2, in another embodiment, the invention is directed to a method for combining "transmitted data"/"network packets" provided by platform manufacturers into a single receiver accepting from heterogeneous platforms. The method including the sequential steps of preparing the receiver of the previous embodiment. After preparation of the receiver, the method continues by receiving at least two video signals from the heterogeneous platforms by the receiver and receiving at least two audio signals from the heterogeneous platforms. The at least two video signals from heterogeneous platforms are synchronized with their audio signals in the receiver, wherein the synchronized signals are directed from at least two video signals and audio signals from heterogeneous platforms in the receiver to a video renderer and a sound renderer. The method concludes by simultaneously distributing the synchronized video signals and audio signals to available renderers (e.g. display, connected projector, speakers, and headphones).

In yet another embodiment, the invention is directed to computer-readable medium storing software that combines "transmitted data"/"network packets" provided by platform manufacturers into a single receiver accepting from heterogeneous platforms. The software includes executable code that receives at least two video signals from the heterogeneous platforms by the receiver and receives at least two audio signals from the heterogeneous platforms. The executable code synchronizes the video signals and audio signals from heterogeneous platforms in the receiver and directs synchronized signals from the at least two video signals from heterogeneous platforms in the receiver to a video renderer (such as a video card). The executable code simultaneously distributes the synchronized signals from at least two audio signals to a sound renderer (such as a sound card).

EXAMPLES

As discussed herein and best illustrated in FIGS. 1, 2 and 3, in a non-limiting example, the receiver 10 provides the transformation of the two signals, one from AirPlay and one from Miracast, for presentation any device to receive the "mirrored platforms". Within the receiver 10, the method has multiple steps directed by software code executed on a computing device such as a PC, Mac, computing stick or any platform capable of executing computer code to perform this transformation. The present invention provides a receiver that is capable of accepting mirroring from any type of device independent of its type. Thus, as illustrated in FIGS. 1, 2 and 3 the present invention allows a Miracast capable sending device and an AirPlay capable sending device, to mirror to an external display at the same time. The user of the receiver is not restricted to mirroring from any particular type of device and therefore, a user can bring their personal device to a meeting, school or any situation where content needs to be shared. The video output signals of the present invention are directed to the "monitor" selected in the software's settings. Typically, this is a physical device such as a monitor or a projector connected to the computer running the software. The audio signals are directed to the "output" device selected in the software's settings. Typically, this is the speaker output on a sound card.

The present invention provides the capability to interact with multiple types of devices. More particularly, a user with an iOS device, another with an Android device and yet another one with a Windows device can all at the same time mirror their content to the external display using the present invention; commercially named AirServer Universal™.

Another example of the present invention providing a beneficial situation would be a classroom setting. A teacher has a device for sharing information with students via mirroring. Students have their own devices and can share their screen (which may, for example, contain solutions to school assignments) by mirroring at the same time. Without AirServer Universal™ they would all need to decide to use one type of device to achieve this. With AirServer Universal™, students can bring their device of choice (iOS, Windows, Android based devices) and have no restrictions on who can mirror to the external display.

An additional example can be directed to the field of healthcare, wherein two health care professionals comparing notes on a patient, like x-rays having two different types of devices can now compare these side by side on a large screen. Further one skilled in the art would appreciate the present invention would allow the ability to "overlay" multiple types images, e.g. x-rays, for comparison purposes. More particularly, the present invention would allow the multiple images to be "overlaid" so as to view progression of a malady by size or time, e.g. progression of tumor size or increase in amount of cells.

Yet another application of the invention is in the field of gaming, wherein two or more players of a computer game can simultaneously project their gaming sessions from their devices for the purpose of comparison or entertaining an audience.

A further example can be found in the field of software development, wherein two or more software developers/designers interact to take a reference design of user interaction and ensure the design is working properly or as designed by mirroring the reference design of one device next to an implementation of the same software on another platform. This is performed in software quality assurance testing using the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A screen mirroring receiver capable of receiving and processing a first mirroring stream from a first device and a second mirroring stream from a second device, the first and second mirroring streams conforming to different vendor-provided screen-mirroring protocols, said screen mirroring receiver comprising a memory storing instructions that, when executed by a processor, cause the screen mirroring receiver to:

identify, by a first protocol handler, a first screen mirroring protocol of the first mirroring stream;

receive, by a first protocol decoder operatively coupled to the first protocol handler, first video data and a first audio data, said first video data and said first audio data being derived from said first mirroring stream, and produce, by said first protocol decoder, a synchronized first video output and a synchronized first audio output, wherein said synchronized first video output and said synchronized first audio output are time synchronized to each other;

identify, by a second protocol handler different from said first protocol handler, the screen mirroring protocol of the second mirroring stream;

receive, by a second protocol decoder operatively coupled to the second protocol handler, a second video data and a second audio data, said second video data and said second audio data being derived from said second mirroring stream, and produce, by said second protocol decoder, a synchronized second video output and a synchronized second audio output, wherein said synchronized second video output and said synchronized second audio output are time synchronized to each other, wherein said second protocol decoder is different from said first protocol decoder; and receive, by a video processor coupled to said first protocol decoder and said second protocol decoder, said synchronized first video output and said synchronized second video output, and produce, by said video processor, from said first and second video outputs a single combined video signal for transmission to a display;

transmit, by said first protocol decoder, said synchronized first audio output to an audio renderer, and transmit, by said second protocol decode, said synchronized second audio output to said audio renderer.

2. The screen mirroring receiver of claim 1, wherein said synchronized first video output comprises a video frame associated with the first video data.

3. The screen mirroring receiver of claim 2, wherein said synchronized second video output comprises a video frame associated with the second video data.

4. The screen mirroring receiver of claim 1, wherein said video processor receives a first orientation information associated with said first video data and a second orientation information associated with said second video data.

5. The screen mirroring receiver of claim 1, further comprising receiving, by a demultiplexer coupled to said second protocol handler and said second protocol decoder, a multiplexed audio-visual signal associated with said second mirroring stream and separating, by said demultiplexer, said multiplexed audiovisual signal to produce said second video data and said second audio data.

6. The screen mirroring receiver of claim 5, wherein said second audio data comprises a time synchronization information.

7. The screen mirroring receiver of claim 1, wherein the different vendor-provided screen-mirroring protocols are selected from a group comprising the AirPlay protocol, the Miracast protocol, and the Google Cast protocol.

8. A screen mirroring system capable of receiving and processing a first mirroring stream from a first device and a second mirroring stream from a second device, the first and second mirroring streams conforming to different vendor-provided screen-mirroring protocols, said screen mirroring system comprising:

a screen mirroring receiver comprising a memory storing instructions that, when executed by a processor, cause the screen mirroring receiver to:

identify, by a first protocol handler, the screen mirroring protocol of the first mirroring stream, receive, by a first protocol decoder operatively coupled to the first protocol handler, a first video data and a first audio data, said first video data and said first audio data being derived from said first mirroring stream, and produce, by said first protocol decoder, a synchronized first video output and a synchronized first audio output,
wherein said synchronized first video output and said synchronized first audio output are time synchronized to each other;
identify, by a second protocol handler, the screen mirroring protocol of the second mirroring stream;
receive, by a second protocol decoder operatively coupled to the second protocol handler, a second video data and a second audio data, said second video data and said second audio data being derived from said second mirroring stream, and produce, by said second protocol decoder a synchronized second video output and a synchronized second audio output, wherein said synchronized second video output and said synchronized second audio output are time synchronized to each other, wherein said second protocol decoder is different from said first protocol decoder;
receive, by a video processor coupled to said first protocol decoder and said second protocol decoder, said synchronized first video output and said synchronized second video output, and produce, by said video processor from said first and second video outputs a single combined video signal;
the system further comprising:
a display coupled to said video processor and configured to receive said single combined video signal; and
an audio renderer coupled to said first protocol decoder and said second protocol decoder, said audio renderer receiving said synchronized first and second audio signals;
wherein, using said single combined video signal and said synchronized first and second audio signals, said screen mirroring system produces an audio-visual rendering of a first content in said first mirroring stream from the first device and a second content in said second mirroring stream from the second device.

9. The screen mirroring system of claim 8, wherein said synchronized first video output comprises a video frame associated with the first video data.

10. The screen mirroring system of claim 9, wherein said synchronized second video output comprises a video frame associated with the second video data.

11. The screen mirroring system of claim 8, wherein said video processor receives a first orientation information associated with said first video data and a second orientation information associated with said second video data.

12. The screen mirroring system of claim 8, further comprising receiving, by a demultiplexer coupled to said second protocol handler and said second protocol decoder, a multiplexed audio-visual signal associated with said second mirroring stream and separating, by said demultiplexer, said multiplexed audio-visual signal to produce said second video data and said second audio data.

13. The screen mirroring system of claim 12, wherein said second audio data comprises a time synchronization information.

14. The screen mirroring system of claim 8, wherein the different vendor-provided screen-mirroring protocols are selected from a group comprising the AirPlay protocol, the Miracast protocol, and the Google Cast protocol.

15. A method for screen mirroring of mirroring streams, the method comprising:
receiving a first mirroring stream from a first device and a second mirroring stream from a second device, the first and second mirroring streams conforming to different vendor-provided screen mirroring protocols;
identifying, by a first protocol handler, the screen mirroring protocol of the first mirroring stream;
deriving a first video data and a first audio data from said first mirroring stream;
receiving, by a first protocol decoder, said first video data and said first audio data;
decoding, by said first protocol decoder said first video data and said first audio data;
producing, by said first protocol decoder a synchronized first video output and a synchronized first audio output,
wherein said synchronized first video output and said synchronized first audio output are time synchronized to each other;
identifying, by a second protocol handler, the screen mirroring protocol of the second mirroring stream;
deriving a second video data and a second audio data from said second mirroring stream;
receiving, by a second protocol decoder, said second video data and said second audio data, said second protocol decoder being different from said first protocol decoder;
decoding, by said second protocol decoder said second video data and said second audio data;
producing, by said second protocol decoder, a synchronized second video output and a synchronized second audio output, wherein said synchronized second video output and said synchronized second audio output are time synchronized to each other;
receiving, by a video processor said synchronized first video output and said synchronized second video output;
producing, by said video processor, a single combined video signal;
displaying, by a viewing device, said single combined video signal; and
audio rendering, by an audio renderer, said synchronized first and second audio signals;
wherein a first content in said first mirroring stream from the first device and a second content in said second mirroring stream from the second device are mirrored.

16. The method of claim 15, wherein at least one of said synchronized first video output and said synchronized second video output comprises a video frame.

17. The method of claim 15, wherein the step of receiving by a video processor of said synchronized first video output and said synchronized second video output, further comprises receiving a first orientation information associated with said first video data and a second orientation information associated with said second video data.

18. The method of claim 15 further comprising the steps of:
(a) receiving, by a demultiplexer, from said second protocol handler a multiplexed audio-visual signal associated with said second mirroring stream; and
(b) separating, by said demultiplexer, said multiplexed audio-visual signal to produce said second video data and said second audio data.

19. The method of claim 18, wherein said second audio data comprises a time synchronization information.

20. The method of claim 15, wherein the different vendor-provided screen-mirroring protocols are selected from a group comprising the AirPlay protocol, the Miracast protocol, and the Google Cast protocol.

* * * * *